US 6,738,551 B2

(12) United States Patent
Noda et al.

(10) Patent No.: US 6,738,551 B2
(45) Date of Patent: May 18, 2004

(54) TWO-DIMENSIONAL PHOTONIC CRYSTAL, AND MULTIPLEXER/DEMULTIPLEXER USING THE SAME

(75) Inventors: Susumu Noda, Kyoto (JP); Alongkarn Chutinan, Kyoto (JP); Daisuke Miyauchi, Tokyo (JP); Yoshikazu Narumiya, Tokyo (JP)

(73) Assignee: Kansai Technology Licensing Organization Co., Ltd., Kyoto (JP)

( * ) Notice: Subject to any disclaimer, the term of this patent is extended or adjusted under 35 U.S.C. 154(b) by 289 days.

(21) Appl. No.: 09/814,728

(22) Filed: Mar. 23, 2001

(65) Prior Publication Data

US 2002/0009277 A1 Jan. 24, 2002

(30) Foreign Application Priority Data

Mar. 24, 2000 (JP) ........................................ 2000-084869

(51) Int. Cl.$^7$ ................................................ G02B 6/10
(52) U.S. Cl. .................................................... 385/130
(58) Field of Search .............................. 385/130, 129, 385/131, 14, 147, 344

(56) References Cited

U.S. PATENT DOCUMENTS

| 5,526,449 A | 6/1996 | Meade et al. |
| 5,784,400 A | 7/1998 | Joannopoulos et al. |
| 6,468,823 B1 * | 10/2002 | Scherer et al. ................ 438/31 |

FOREIGN PATENT DOCUMENTS

| JP | 11-218627 | * 10/1999 | ............. H01S/3/18 |
| JP | 11-330619 | * 11/1999 | ............. H01S/3/18 |
| WO | WO 98/57207 | 12/1998 | |

OTHER PUBLICATIONS

Eli Yablonovitch, "Inhibited Spontaneous Emission in Solid–State Physics and Electronics," Physical Review Letters, vol. 58, No. 20, May 18, 1987, pp. 2059–2062.
Sajeev John, "Strong Localization of Photons in Certain Disordered Dielectric Superlattices," Physical Review Letters, vol. 58, No. 23, Jun. 8, 1987, pp. 2486–2489.
O. Painter, et al., "Two–Dimensional Photonic Band–Gap Defect Mode Laser," Science, vol. 284, Jun. 11, 1999, pp. 1819–1821.
Kane S. Yee, "Numerical Solution of Initial Boundary Value Problems Involving Maxwell's Equations in Isotropic Media," IEEE Transactions on Antennas and Propagation, vol. AP–14, No. 3, May 1966, pp. 302–307.

(List continued on next page.)

Primary Examiner—Jean F. Duverne
(74) Attorney, Agent, or Firm—Oblon, Spivak, McClelland, Maier & Neustadt, P.C.

(57) ABSTRACT

In a 2D photonic crystal waveguide comprising a 2D photonic crystal structure based on a slab (11) formed of a material having a higher refractive index than air, in which a material (16) having a lower refractive index than the slab material is periodically arrayed to provide a refractive index distribution, a photonic crystal waveguide is created by forming a line defect (12), which functions as a waveguide, in the periodic array of photonic crystal, and at least one point defect (14) is disposed adjacent the photonic crystal waveguide to act as a disorder in the periodic array of photonic crystal. The point defect functions as a light or electromagnetic radiation outlet/inlet port for trapping light or electromagnetic radiation of a selected wavelength among light or electromagnetic radiation propagating through the waveguide and radiating it, or trapping light or electromagnetic radiation of a selected wavelength from the exterior and introducing it into the waveguide.

13 Claims, 12 Drawing Sheets

OTHER PUBLICATIONS

Gerrit Mur, "Absorbing Boundary Conditions for the Finite–Difference Approximation of the Time–Domain Electromagnetic–Field Equations," IEEE Transactions of Electromagnetic Compatibility, vol. EMC–23, No. 4, Nov. 1981, pp. 377–382.

O. Painter, et al., "Defect Modes of a Two–Dimensional Photonic Crystal in an Optically Thin Dielectric Slab," Journal Optical Society of America B, vol. 16, No. 2, Feb. 1999, pp. 275–285.

Alongkam Chutinan, et al., "Highly Confined Waveguides and Waveguide Bends in Three–Dimensional Photonic Crystal," Applied Physics Letters, vol. 75, No. 24., Dec. 13, 1999, pp. 3739–3741.

Shanhui Fan, et al., "Channel Drop Tunneling Through Localized States," Physical Review Letters, vol. 80, No. 5, Feb. 2, 1998, pp. 960–963.

Atila Mekis, et al., "High Transmission Through Sharp Bends in Photonic Crystal Waveguides," Physical Review Letters, vol. 77, No. 18, Oct. 28, 1996, pp. 3787–3790.

Hideo Kosaka, et al., "Self–Collimating Phenomena in Photonic Crystals," Applied Physics Letters, vol. 74, No. 9, Mar. 1, 1999, pp. 1212–1214.

Senta Suzuki, "Arrayed–Waveguide (AWG) Device," Journal of the Institute of Electronics, Information and Communication Engineers (IEICE), vol. 82, No. 7, Jul. 1999, pp. 746–752.

Hideo Kosaka, "Photonic Crystal Optics Starting with Super–Prism—Toward Functional Microoptic Circuits–," O plus E, Dec. 1992, pp. 1560–1569.

K. Takano, et al., Fifth Asia–Pacific Conference on Communications and Fourth Optoelectronics and Communications Conference. APCC/OECC '99. Proceedings. Conference–Vitality to the New Century (IEEE Cat. No.99EX379), Proceedings of APCC/OECC '99 5th Asia Pacific Conference, vol. 1, pp. 327–328, "Numerical Analysis of Wavelength Demultiplexer Using Localized Mode in 2–D Photonic Crystal," 1999.

M.D.B. Charlton, et al., Materials Science and Engineering, vol. 49, No. 2, pp. 155–165, "Guided Mode Analysis, and Fabrication of a 2–Dimensional Visible Photonic Band Structure Confined Within a Planar Semiconductor Waveguide," Sep. 19, 1997.

* cited by examiner

TWO-DIMENSIONAL PHOTONIC CRYSTAL, AND MULTIPLEXER/DEMULTIPLEXER USING THE SAME

TECHNICAL FIELD

This invention relates to a photonic crystal for use as a ultrasmall optical circuit device, and more particularly, to a two-dimensional photonic crystal having a two-dimensional periodic distribution of refractive index. It further relates to a waveguide having a light or electromagnetic radiation outlet/inlet port created by introducing a line defect and a point defect in such photonic crystal, and a wavelength demultiplexer.

BACKGROUND ART

With the recent advance of wavelength multiplexing communication systems, wavelength demultiplexers, multiplexers and filters become more important.

The optical branching/inserting device for wavelength multiplexing communication systems, also known as optical add/drop multiplexing device, has a function of taking a signal of a certain channel out of multiplexed signals or add the same to an empty channel. General constructions include array waveguide diffraction grating and fiber grating types. The array waveguide diffraction grating is a kind of diffraction grating having an array of a plurality of optical waveguides of different length in which the difference in length between waveguides creates a wavelength-dependent slope of wavefront so that upon input of wavelength-multiplexed light, the light is demultiplexed in terms of wavelength into different waveguides to produce outputs (see Journal of IEICE, pp. 746–749, 1999, for example). In the fiber grating type, only signals of a specific wavelength are taken out of the drop port or introduced from the add port by Bragg reflection at the fiber grating.

In the prior art wavelength multiplexers/demultiplexers of the array waveguide diffraction grating type, however, the radius of curvature must be kept significantly large in order to reduce a bend loss, resulting in a very large device size.

Many proposals were then made based on the concept of forming an ultrasmall optical multiplexer/demultiplexer using photonic crystal. These proposals are described in, for example, Applied Physics Letters, vol. 75, pp. 3739–3741, 1999 (Reference 1) and Physical Review Letters, vol. 80, pp. 960–963, 1998 (Reference 2).

The photonic crystal is a crystal having a periodic distribution of refractive index therein, which enables to establish novel optical characteristics using an artificial periodic structure.

One of the important features of the photonic crystal is the presence of a photonic bandgap. In photonic crystal having a three-dimensional periodicity (referred to as a 3D photonic crystal, hereinafter), a full bandgap that prohibits propagation of light in all directions can be formed. This enables local confinement of light, control of spontaneous emission light, and formation of a waveguide by the introduction of a line defect, indicating a possibility to realize an ultrasmall optical circuit.

Reference 1 suggests that an ultrasmall light demultiplexer can be formed by branching a waveguide formed by introducing a line defect into a 3D photonic crystal, but does not illustrate any specific structure.

Active studies have been made on a photonic crystal having a two-dimensional periodic structure (referred to as a 2D photonic crystal, hereinafter), because its fabrication is relatively easy. Reference 2 describes the analytic results of a demultiplexer using a branched waveguide.

A refractive index periodicity structure of 2D photonic crystal is formed by arranging cylindrical holes in a high refractive index material in a square or triangular lattice pattern. Alternatively, it is formed by arranging cylinders of a high refractive index material in a low refractive index material in a square lattice pattern. Photonic bandgaps are formed from these periodicity structures whereby the propagation of in-plane light is controlled. By introducing a line defect into this periodic structure, a waveguide can be created. See, for example, Physical Review Letters, vol. 77, pp. 3787–3790, 1996, and Reference 2.

Reference 2 relates to the array of cylinders of a high refractive index material in a square lattice pattern. It is noted that although the propagation of light in the in-plane direction can be controlled by a bandgap as previously described, the propagation of light in upward and downward directions cannot be controlled by the periodic structure. Analysis is thus made on a straight waveguide and a 90° bend branch configuration and branch configuration on the assumption that the height is infinite.

However, since it is impossible for an actual device to have an infinite height, light must be confined within a finite height.

On the other hand, where cylindrical holes are formed in a high refractive index material, a waveguide can be created by forming the high refractive index material as a slab, and providing low refractive index layers above and below the slab so as to confine light by total reflection.

However, no research has been made on multiplexers and demultiplexers of such a structure. Also, no research has been made on the 90° bend branch configuration and branch configuration of guiding light propagating in the in-plane direction to the orthogonal direction or guiding light from the orthogonal direction to the in-plane direction.

Optical multiplexers and demultiplexers using a super-prism based on self-organized 3D crystal have also been studied. See, for example, Applied Physics Letters, vol. 74, pp. 1212–1214, 1999 and O plus E, December 1999, pp. 1560–1565. They are not combined with waveguides, and only the function of an independent device is investigated.

If a photonic crystal waveguide is able to deliver a light output with wavelength selectivity in a certain wavelength region or receive a light input with wavelength selectivity, it becomes possible to realize an optical circuit having a light demultiplexing/multiplexing function of much smaller size than conventional devices. Also, if light or electromagnetic radiation in a 2D photonic crystal waveguide can be guided to the orthogonal direction, a steric light or electromagnetic radiation circuit can be obtained.

SUMMARY OF THE INVENTION

An object of the invention is to provide a construction capable of guiding or receiving light or electromagnetic radiation propagating through a 2D photonic crystal waveguide in a direction orthogonal to the plane thereof, the construction being effective for forming a light or electromagnetic radiation waveguide or a light or electromagnetic radiation multiplexer/demultiplexer.

The above and other objects are attained by the invention which is defined below.

(1) A two-dimensional photonic crystal waveguide comprising a two-dimensional photonic crystal structure based on a slab formed of a material having a higher refractive index than air, in which a material having a lower refractive index than the slab material is periodically arrayed to provide a refractive index distribution, a photonic crystal waveguide created by forming a line defect in the periodic array of photonic crystal, the line defect functioning as a waveguide, and at least one point defect disposed adjacent the photonic crystal waveguide to act as a disorder in the periodic array of photonic crystal, wherein the point defect functions as a light or electromagnetic radiation outlet/inlet port for trapping light or electromagnetic radiation of a selected wavelength among light or electromagnetic radiation propagating through the waveguide and radiating it, or trapping light or electromagnetic radiation of a selected wavelength from without the waveguide and introducing it into the waveguide.

(2) The two-dimensional photonic crystal waveguide of (1) wherein the light or electromagnetic radiation outlet/inlet port is to radiate or introduce the light or electromagnetic radiation propagating in a direction orthogonal to the slab surface.

(3) The two-dimensional photonic crystal waveguide of (1) or (2) wherein the wavelength of light or electromagnetic radiation radiated or introduced by the point defect differs depending on the shape of the point defect.

(4) The two-dimensional photonic crystal waveguide of any one of (1) to (3) wherein the array of the lower refractive index material is formed by filling cylindrical holes in the slab with the lower refractive index material.

(5) The two-dimensional photonic crystal waveguide of any one of (1) to (4) wherein the array of the lower refractive index material is a triangular lattice array.

(6) The two-dimensional photonic crystal waveguide of any one of (1) to (5) wherein the point defect is configured so as to be asymmetric on opposite sides with respect to the slab surface.

(7) The two-dimensional photonic crystal waveguide of any one of (1) to (6) wherein the slab material has a refractive index of at least 2.0.

(8) The two-dimensional photonic crystal waveguide of (7) wherein the slab material is an inorganic material containing at least one element selected from the group consisting of In, Ga, Al, Sb, As, Ge, Si, P, N, and O or an organic material.

(9) The two-dimensional photonic crystal waveguide of any one of (1) to (8) wherein the lower refractive index material is air.

(10) A photonic crystal wavelength demultiplexer comprising the two-dimensional photonic crystal waveguide of any one of (1) to (9).

(11) The photonic crystal wavelength demultiplexer of (10) wherein there are included a plurality of point defects and wavelength of light or electromagnetic radiation radiated or trapped by each point defect differs.

(12) The photonic crystal wavelength demultiplexer of (10) or (11), further comprising an optical fiber disposed in proximity to the point defect.

(13) The photonic crystal wavelength demultiplexer of (10) or (11), further comprising a semiconductor device having a photoelectric conversion function disposed in proximity to the point defect.

In the 2D photonic crystal waveguide of the invention comprising a 2D photonic crystal structure based on a slab formed of a material having a higher refractive index than air, in which a material having a lower refractive index than the slab material is periodically arrayed to provide a refractive index distribution, a photonic crystal waveguide is created by forming a line defect, which functions as a waveguide, in the periodic array of photonic crystal, and at least one point defect is disposed adjacent the photonic crystal waveguide to act as a disorder in the periodic array of photonic crystal. The point defect functions as a light or electromagnetic radiation outlet/inlet port for trapping light or electromagnetic radiation of a selected wavelength among light or electromagnetic radiation propagating through the waveguide and radiating it, or trapping light or electromagnetic radiation of a selected wavelength from the exterior and introducing it into the waveguide.

The waveguide and the point defect according to the invention can transport, receive and deliver not only light, but also electromagnetic radiation having a character approximate to light.

Where a point defect is formed in proximity to the waveguide formed by the line defect, introduction and removal of light or electromagnetic radiation into and out of the point defect becomes possible so that a light or electromagnetic radiation inlet/outlet port is available. The point defect becomes a disordered site in the 2D photonic crystal structure based on a slab formed of a material having a higher refractive index than air, in which a material having a lower refractive index than the slab material is periodically arrayed to provide a refractive index distribution.

BRIEF DESCRIPTION OF THE DRAWINGS

Referring to FIG. 1, there is illustrated a waveguide/wavelength demultiplexer according to a first embodiment of the invention in which a point defect is disposed adjacent to a two-dimensional photonic crystal slab waveguide for delivering light or electromagnetic radiation of a selected wavelength in an orthogonal direction. Throughout the specification, directions parallel and orthogonal to a major surface of the two-dimensional photonic crystal slab are referred to as in-plane and orthogonal directions, respectively.

Figure 1:
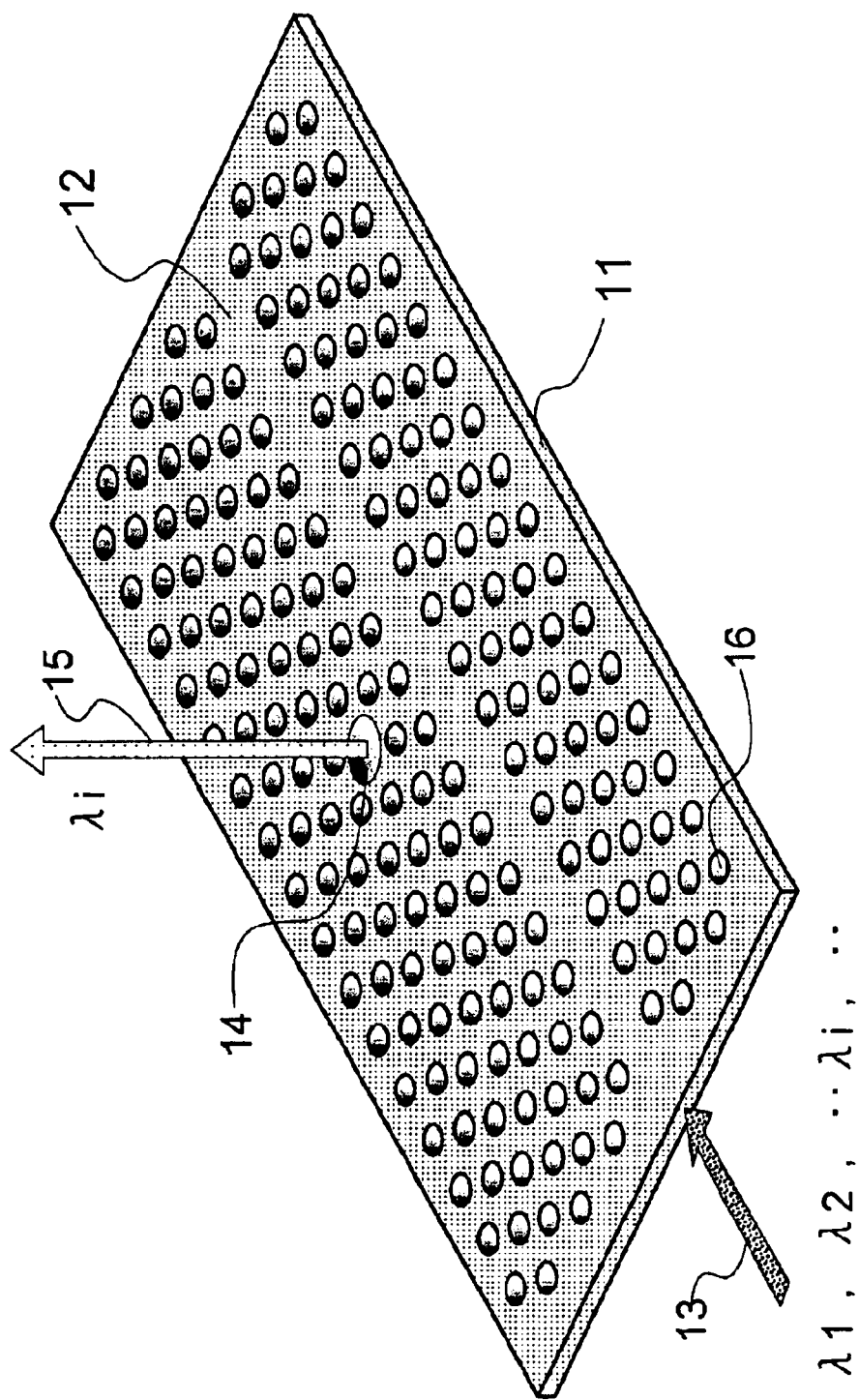
FIG. 1 is a schematic perspective view showing a 2D photonic crystal slab waveguide having one point defect according to one embodiment of the invention.

First, the photonic crystal and the waveguide are described. The photonic crystal used herein is a 2D photonic crystal having a bandgap in an in-plane direction due to a 2D periodic distribution of refractive index, and is structured such that cylindrical holes 16 are arrayed in a slab material 11 in a triangular lattice pattern as shown in FIG. 1.

Incident light or electromagnetic radiation 13 ($\lambda 1, \lambda 2, \ldots \lambda i, \ldots$) within the crystal, is prevented by the bandgap from propagating in the in-plane direction, and confined in the orthogonal direction due to total reflection by upper and lower low refractive index materials.

As shown in FIG. 1, a line defect 12 is incorporated in the photonic crystal by linearly removing some of the cylindrical holes 16 arrayed in the triangular lattice pattern. In the line defect 12, a guided mode exists to form a waveguide.

The material of which the photonic crystal slab structure is formed is desirably a material having a high refractive index because of the need to confine light or electromagnetic radiation in upward and downward directions. Although an InGaAsP slab is used in the illustrated embodiment, there may be used GaAs, a material containing one or more elements selected from among In, Ga, Al, Sb, As, Ge, Si, P, N, and O, an inorganic material such as Si, especially an inorganic semiconductor material, or an organic material.

The material used as the slab should desirably have a higher refractive index as mentioned above, specifically higher than air, preferably at least 2.0, and more preferably at least 3.0.

Figure 3:
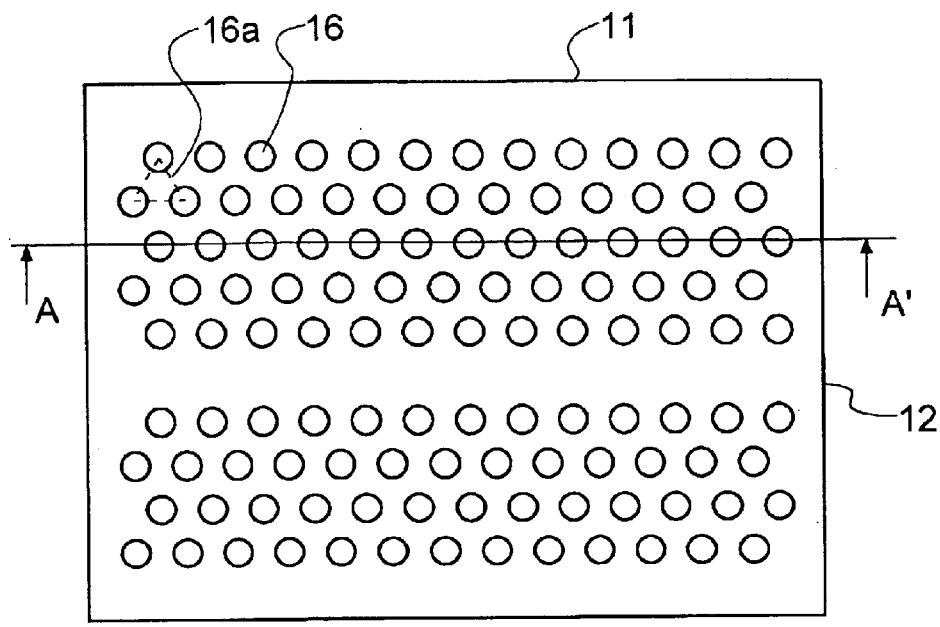
FIG. 3 is a schematic plan view showing the triangular lattice pattern of the 2D photonic crystal slab waveguide of FIG. 1.
Figure 4:
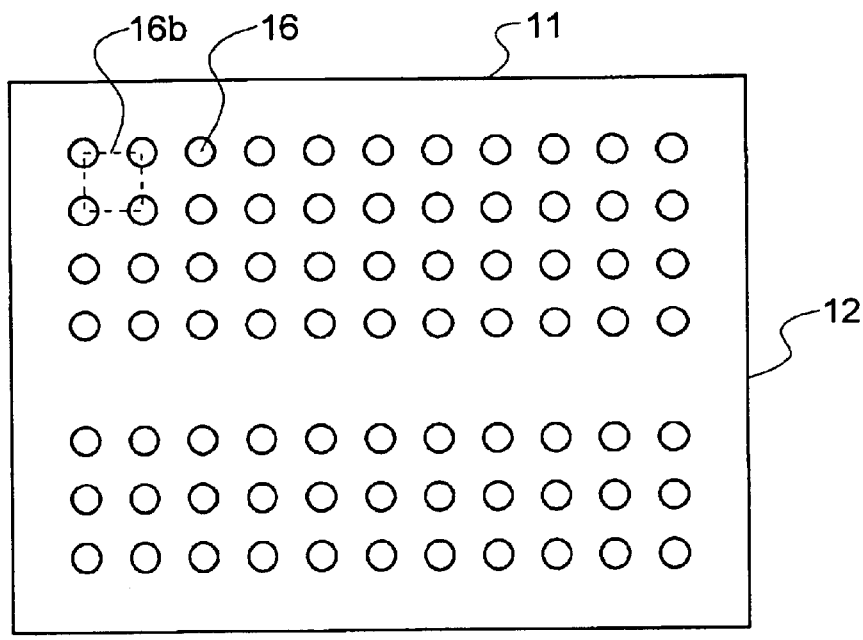
FIG. 4 is a schematic plan view showing the square lattice pattern of the 2D photonic crystal slab waveguide

In the illustrated embodiment, the cylindrical holes 16 are arrayed in a pattern of triangular lattices 16a as shown in FIG. 3, although it is possible to use a photonic crystal in which the cylindrical holes 16 are arrayed in a pattern of square lattices 16b so that a photonic bandgap is present and a defect 12 is linearly incorporated as shown in FIG. 4. It is noted that FIGS. 3 and 4 each are a plan view of a portion of the photonic crystal-constructing slab.

Next, the light or electromagnetic radiation outlet/inlet port is described. As previously described, light or electromagnetic radiation can propagate through a defect waveguide in the 2D photonic crystal. In a linear waveguide, the wavelength range in which light or electromagnetic radiation can be transported at a low loss is relatively wide. Then light or electromagnetic radiation in a wavelength region including the wavelengths of several channels can be transported through the waveguide. By contrast, once a point defect 14 is disposed in proximity to the waveguide as shown in FIG. 1, light or electromagnetic radiation of a selected wavelength is trapped within the defect. While resonating within the defect, the light or electromagnetic radiation 15 is radiated in upward and downward directions having a low Q factor due to the slab shape.

By designing the point defect so as to trap only the wavelength of a particular channel in the wavelength region, the point defect functions not only as the light or electromagnetic radiation outlet/inlet port, but also as a demultiplexer, multiplexer or filter for taking out light or electromagnetic radiation of the selected wavelength ($\lambda i$). With this configuration, the in-plane guided light or electromagnetic radiation can be guided in the orthogonal direction, enabling to form a branching or redirecting path within a minute region. Inversely, light or electromagnetic radiation of a selected wavelength incoming in the orthogonal direction can be guided to the in-plane waveguide.

By appropriately setting the spacing between the waveguide and the point defect, it becomes possible to control the proportion of light or electromagnetic radiation of a selected wavelength to be trapped and radiated. It is then possible to form with ease a light or electromagnetic radiation circuit for taking out or branching a predetermined proportion of light or electromagnetic radiation.

Figure 5:
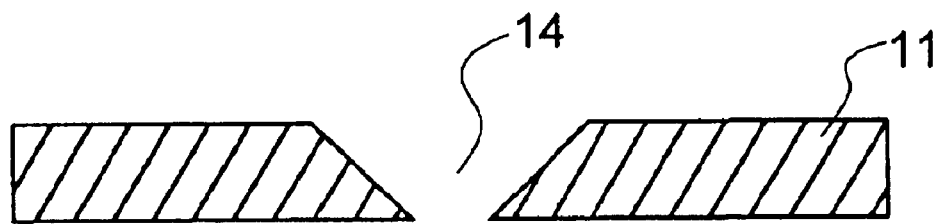
FIG. 5 is a fragmentary cross-sectional view of another form of point defect.
Figure 6:
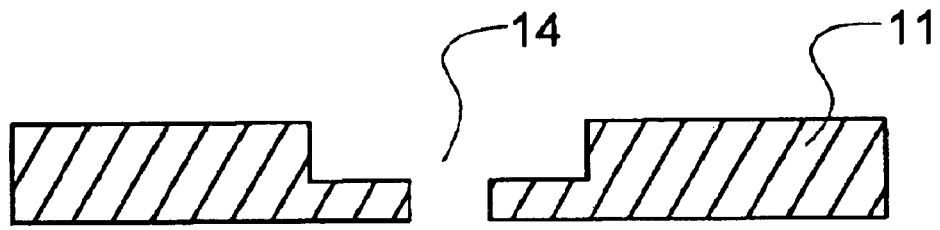
FIG. 6 is a fragmentary cross-sectional view of a further form of point defect.

In the embodiment of FIG. 1, light or electromagnetic radiation is radiated in upward and downward directions because the defect lacks vertical asymmetry. Vertical asymmetry can be incorporated in the defect so that light or electromagnetic radiation is radiated in either one of upward and downward directions. The method of incorporating asymmetry is, for example, by tailoring the shape of the point defect 14 from cylinder to cone as shown in FIG. 5, or by changing the diameter of the point defect 14 between upper and lower levels of the slab 11 as shown in FIG. 6. It is noted that FIGS. 5 and 6 each are a cross-sectional view of a point defect-surrounding portion.

Figure 2:
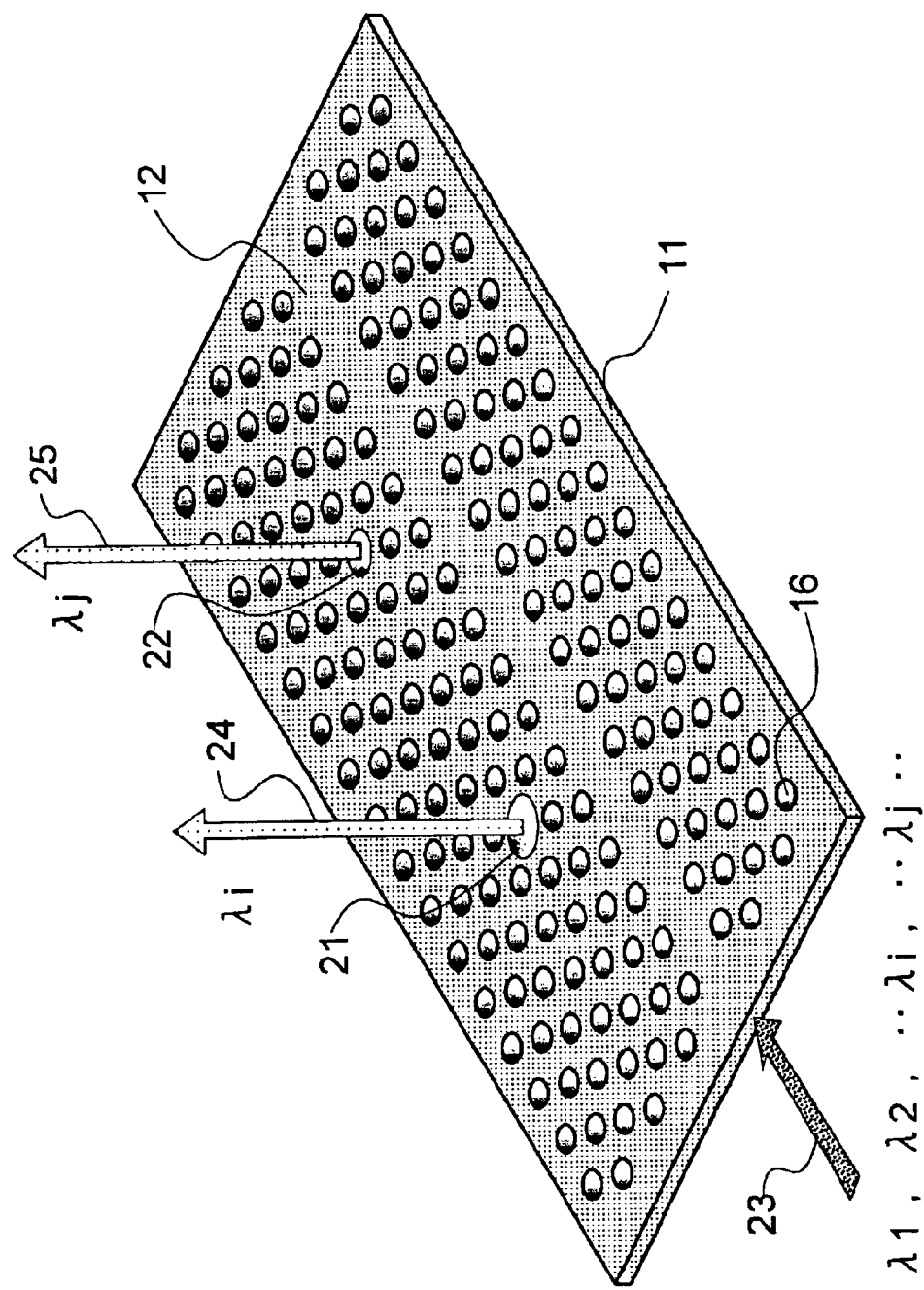
FIG. 2 is a schematic perspective view showing a 2D photonic crystal slab waveguide having two point defects according to another embodiment of the invention.

Referring to FIG. 2, there is illustrated a second embodiment of the invention wherein two point defects 21 and 22 are disposed adjacent to the linear waveguide. Since the wavelength of light or electromagnetic radiation 22, 23 to be trapped or radiated is controlled by the size of each defect, two wavelengths ($\lambda i, \lambda j$) in the region of incident light or electromagnetic radiation ($\lambda 1, \lambda 2, \ldots, \lambda i, \lambda j, \ldots$) can be delivered through the respective point defects. The light or electromagnetic radiation other than the trapped and radiated ones is guided through the linear waveguide. Although a two-channel wavelength demultiplexer is illustrated in this embodiment, a multi-channel wavelength demultiplexer can be formed by increasing the number of defects.

Figure 7:
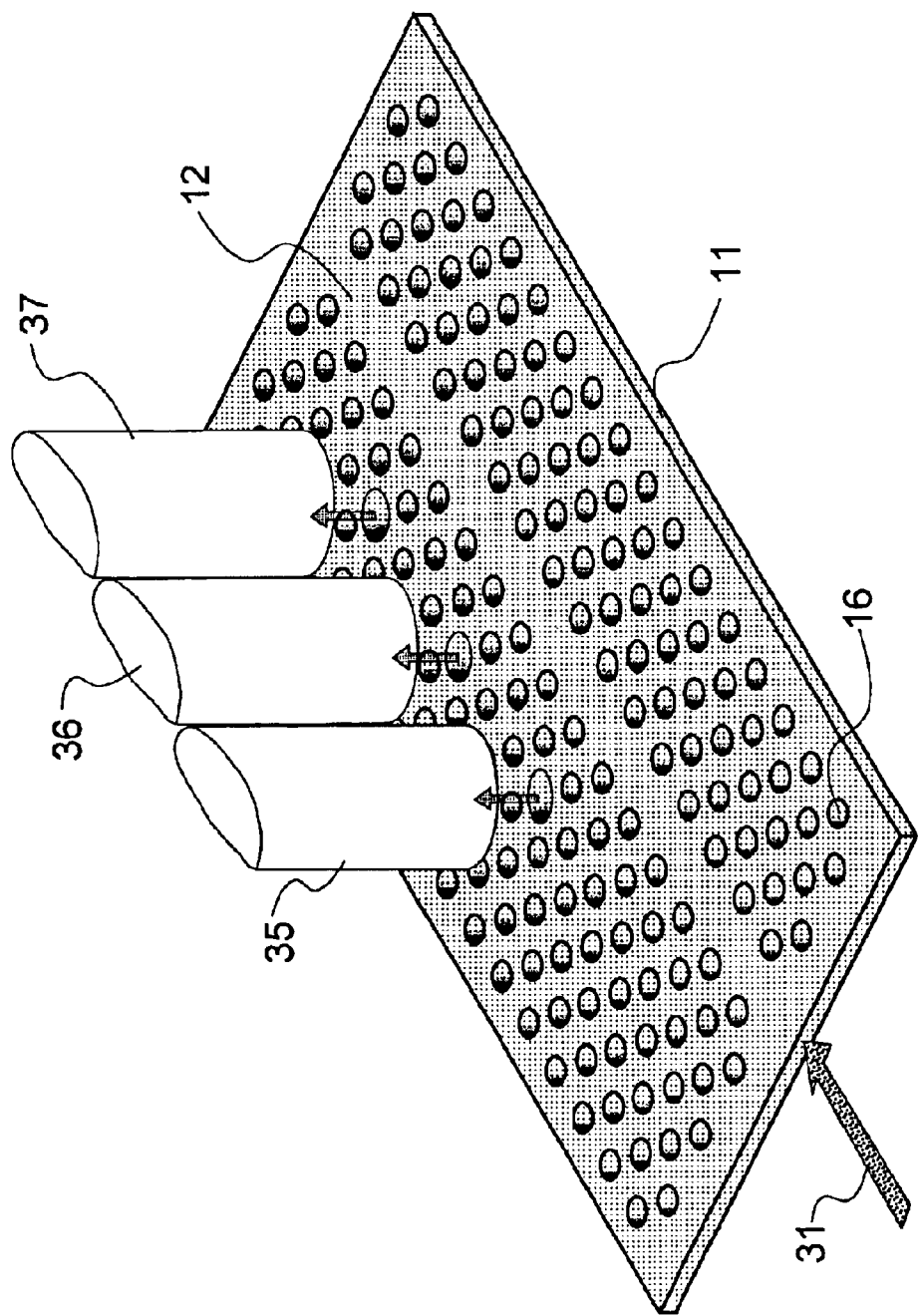
FIG. 7 is a schematic perspective view of a surface output type wavelength demultiplexer according to the invention.

FIG. 7 illustrates the concept of a multiplexer/demultiplexer according to a third embodiment of the present invention. Light or electromagnetic radiation 31 of a certain wavelength region propagates through the photonic crystal waveguide, is trapped by point defects 32 to 34 and delivered in the orthogonal direction.

The light or electromagnetic radiation is introduced into optical fibers 35 to 37 disposed above the point defects and used as signals. The optical fibers are preferably located above the point defects with a sufficient spacing not to cause the photonic crystal structure to be disordered.

Figure 8:
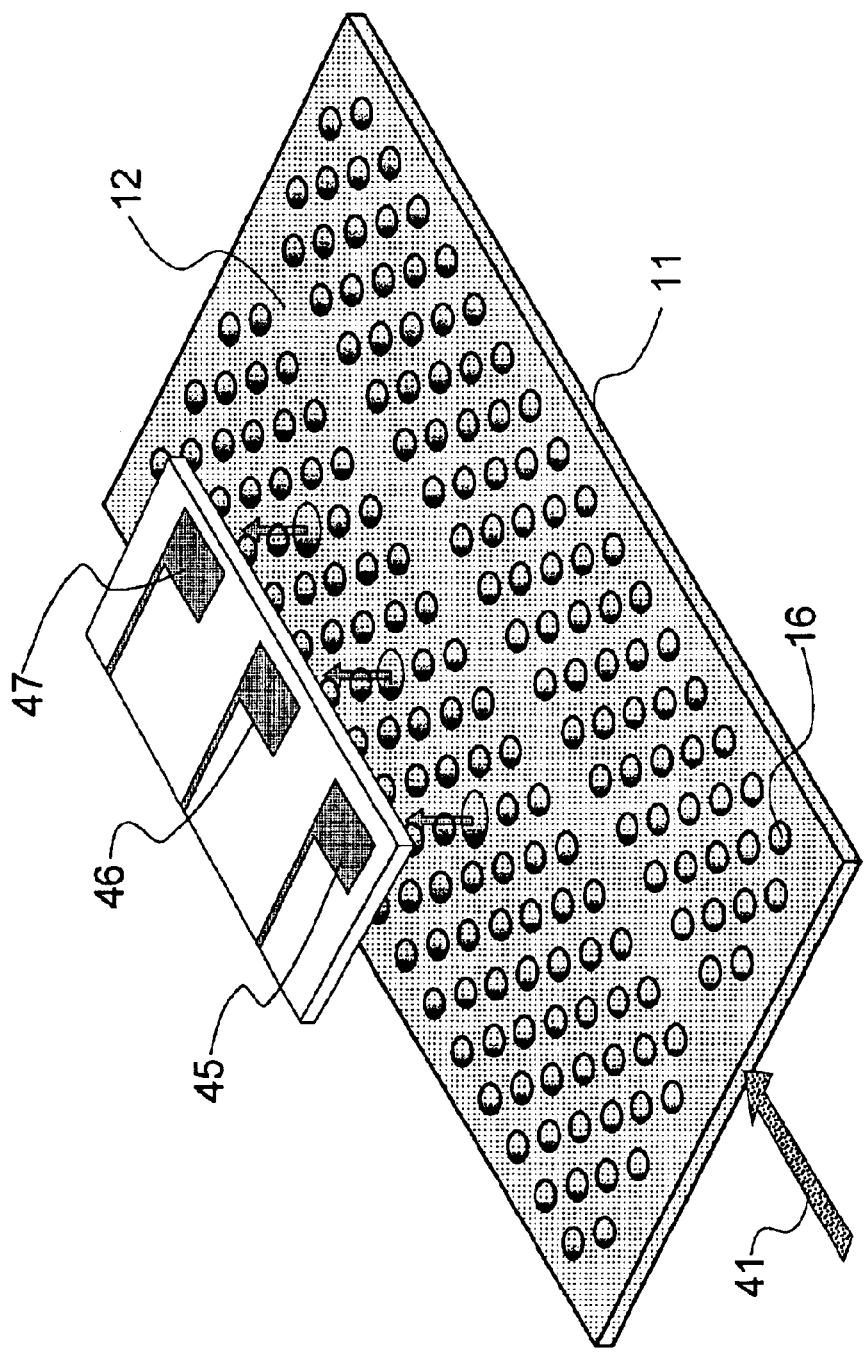
FIG. 8 is a schematic perspective view of another surface output type wavelength demultiplexer according to the invention.

Alternatively, the photonic crystal structure may be integrated with semiconductor devices having a photoelectric conversion function, for example, photodiode arrays 45 to 47 as shown in FIG. 8. With this construction, light or electromagnetic radiation delivered from the point defects 42 to 44 in the orthogonal direction can be directly converted into electrical signals within very small areas.

Now it is described how to fabricate a photonic crystal waveguide/wavelength demultiplexer according to one embodiment of the invention.

Figure 9:
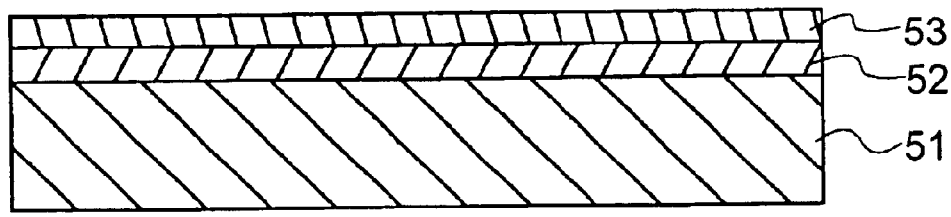
FIGS. 9 to 14 are cross-sectional views showing successive steps of a process of fabricating a 2D photonic crystal InGaAsP slab waveguide.

First of all, as shown in FIG. 9, on an InP substrate 51, for example, an InP layer 52 serving as a buffer layer and a layer of a high refractive index material, typically an InGaAsP layer 53 are formed by crystal growth. Crystal growth is preferably carried out by the MOCVD method and at 590° to 650° C.

Figure 10:
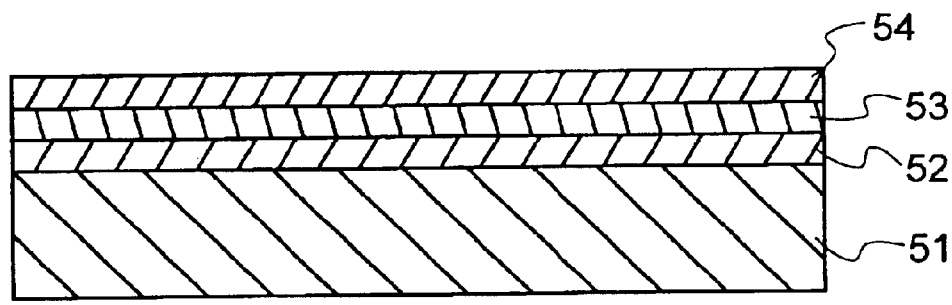
Figure 11:
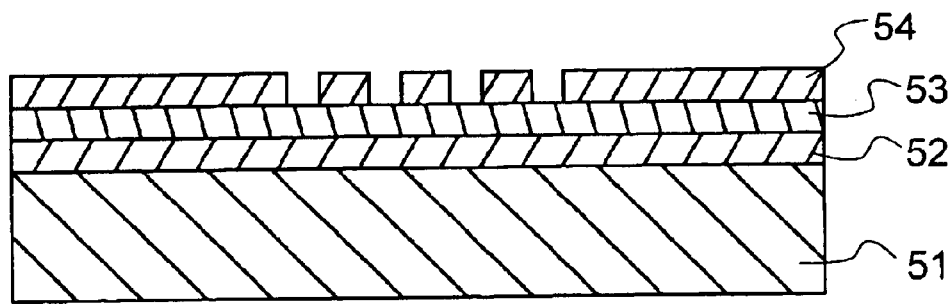

Next, to form a triangular lattice pattern of circular holes and point defects, a photoresist 54 for electron beam patterning is coated as shown in FIG. 10, which is exposed and developed into a resist pattern as shown in FIG. 11. Image exposure with electron beams is employed herein since the lattice constant of the photonic crystal is as small as about 0.5 μm at most even on the assumption that the light or electromagnetic radiation to be transported has a wavelength in the infrared region.

Figure 12:
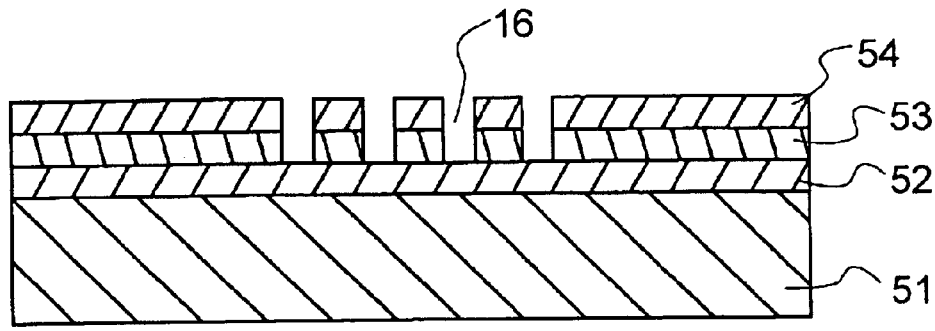

Next, as shown in FIG. 12, cylindrical holes and defects are formed in the InGaAsP slab by reactive ion etching (RIE) using the resist as a mask. The RIE uses a gas mixture of $H_2$ and $CH_4$, for example.

Figure 13:
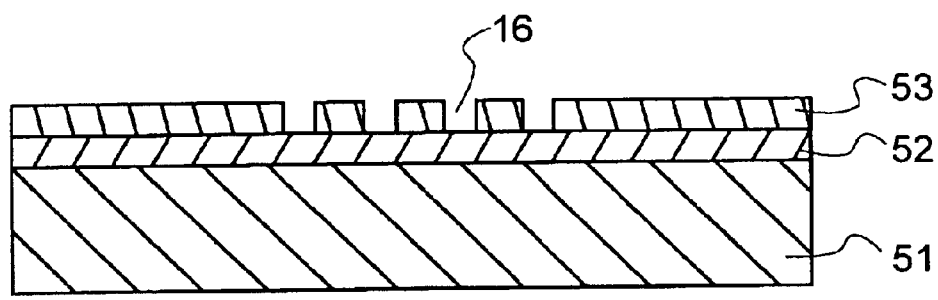
Figure 14:
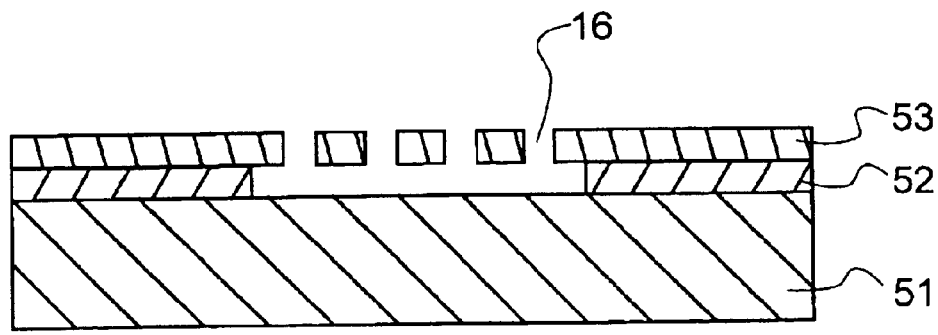

The resist is then removed as shown in FIG. 13. In order to provide air layers having a low refractive index above and below the slab, the InGaAsP slab is processed into a membrane as shown in FIG. 14. This is done by wet etching so as to effect selective etching of the InP layer.

Although InGaAsP is used as the high refractive index material in the above example, silicon (Si) is also useful because it has a high refractive index and can be processed by micro-machining. The fabrication method using Si as the slab material is described below.

Figure 15:
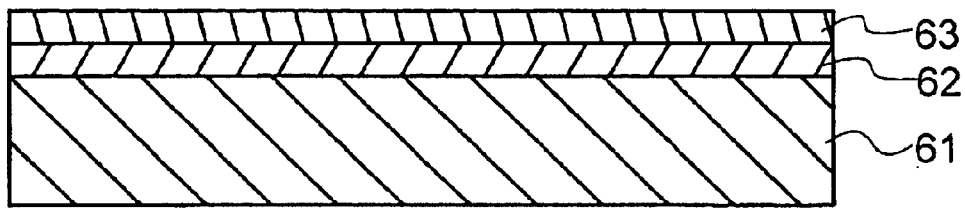
FIGS. 15 to 20 are cross-sectional views showing successive steps of another process of fabricating a 2D photonic crystal InGaAsP slab waveguide.
Figure 16:
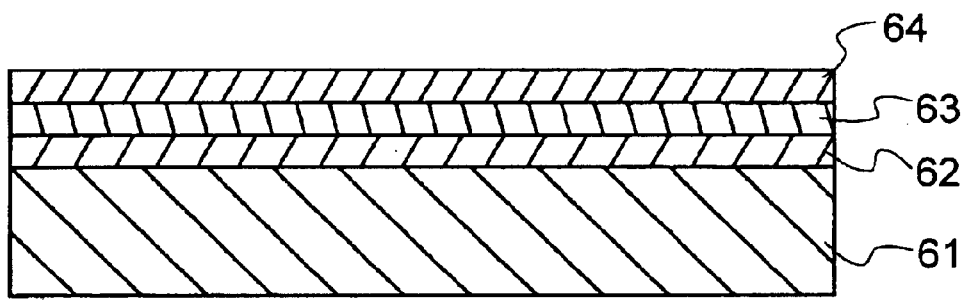
Figure 17:
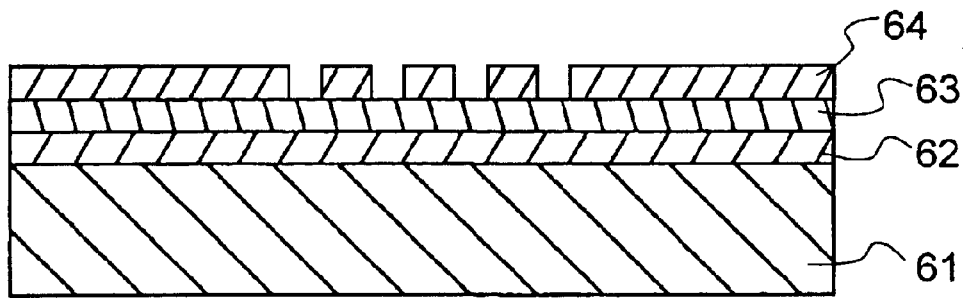

First, there is furnished a silicon-on-insulator (SOI) substrate as shown in FIG. 15. The SOI substrate includes a Si substrate 61 serving as a base and a single crystal Si layer 63 stacked thereon with a $SiO_2$ layer 62 interposed therebetween. Instead of the SOI substrate, a structure having a $SiO_2$ layer and a Si layer grown on a Si substrate is also employable. Next, a photoresist 64 for electron beam patterning is coated as shown in FIG. 16, which is exposed and developed into a resist pattern as shown in FIG. 17.

Figure 18:
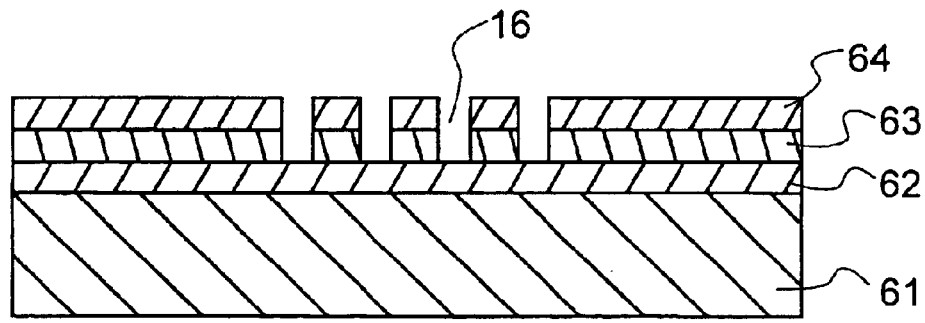
Figure 19:
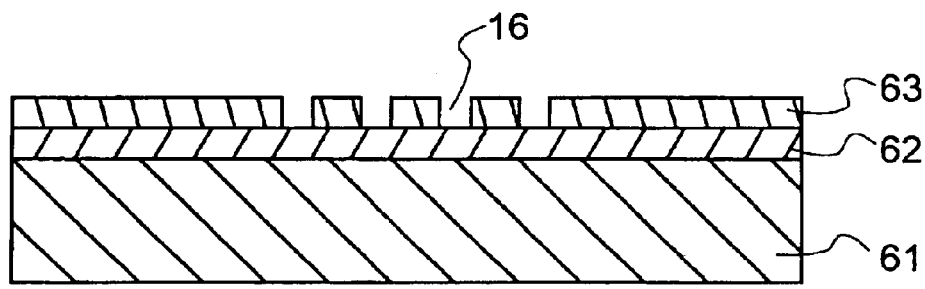
Figure 20:
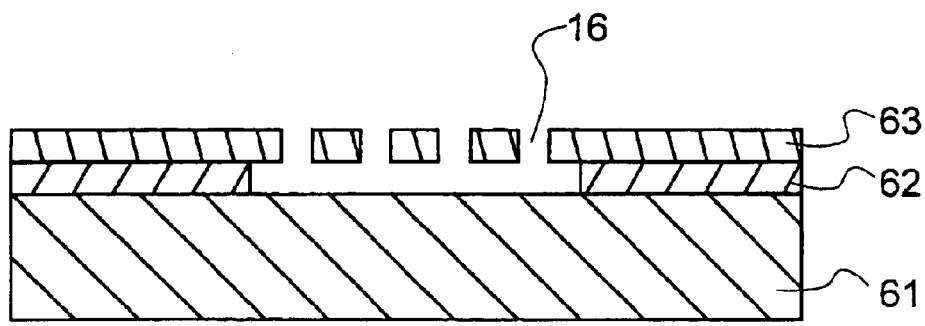

Next, as shown in FIG. 18, cylindrical holes and defects are formed in the Si layer 63 by reactive ion etching (RIE) using the resist 64 as a mask. The RIE uses $SF_6$ gas. Then the resist is removed as shown in FIG. 19. The oxide film layer below the photonic crystal is etched with an aqueous HF solution, leaving a membrane as shown in FIG. 20.

EXAMPLE

Illustrative examples of the invention are described below together with their characteristics.

Figure 21:
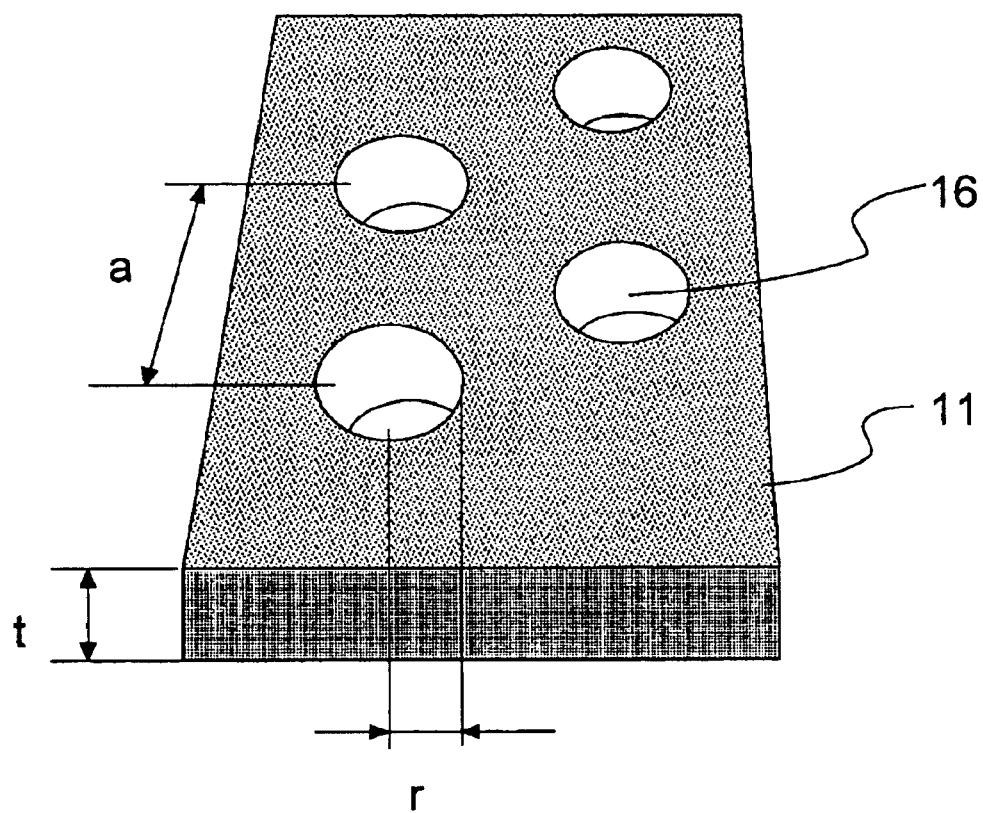
FIG. 21 is a perspective view showing dimensions associated with a 2D photonic crystal.

First described is a photonic crystal. The photonic crystal slab was formed of InGaAsP. For example, as shown in FIG. 21, the photonic crystal has a lattice constant "a," the holes have a radius r of 0.29a, and the slab has a thickness t of 0.6a.

On the slab provided with a line defect and a point defect, analysis was conducted by the finite-difference time-domain (FDTD) method, with the results shown below. It is understood that the FDTD method is a method of directly solving the time-dependent rotational equation among the Maxwell's equations, which is briefly explained below.

In an isotropic medium, the Maxwell's equations is described as follows.

$$\nabla \times E = -\mu \frac{\partial H}{\partial t}$$

$$\nabla \times H = +\varepsilon \frac{\partial E}{\partial t}$$

Herein, μ is a permeability, E is a dielectric constant.

From these equations, the following six difference equations are obtained.

$$H_x^{n+\frac{1}{2}}\left(i, j+\frac{1}{2}, k+\frac{1}{2}\right) = H_x^{n-\frac{1}{2}}\left(i, j+\frac{1}{2}, k+\frac{1}{2}\right) + \frac{\Delta t}{\mu\left(i, j+\frac{1}{2}, k+\frac{1}{2}\right)}\left[\frac{E_y^n\left(i, j+\frac{1}{2}, k+1\right) - E_y^n\left(i, j+\frac{1}{2}, k\right)}{\Delta z} + \frac{E_z^n\left(i, j, k+\frac{1}{2}\right) - E_z^n\left(i, j+1, k+\frac{1}{2}\right)}{\Delta y}\right] \quad (1)$$

$$H_y^{n+\frac{1}{2}}\left(i+\frac{1}{2}, j, k+\frac{1}{2}\right) = H_y^{n-\frac{1}{2}}\left(i+\frac{1}{2}, j, k+\frac{1}{2}\right) + \frac{\Delta t}{\mu\left(i+\frac{1}{2}, j, k+\frac{1}{2}\right)}\left[\frac{E_y^n\left(i+1, j, k+\frac{1}{2}\right) - E_z^n\left(i, j, k+\frac{1}{2}\right)}{\Delta x} + \frac{E_x^n\left(i+\frac{1}{2}, j, k\right) - E_x^n\left(i+\frac{1}{2}, j, k+1\right)}{\Delta z}\right] \quad (2)$$

$$H_z^{n+\frac{1}{2}}\left(i+\frac{1}{2}, j+\frac{1}{2}, k\right) = H_z^{n-\frac{1}{2}}\left(i+\frac{1}{2}, j+\frac{1}{2}, k\right) + \frac{\Delta t}{\mu\left(i+\frac{1}{2}, j+\frac{1}{2}, k\right)}\left[\frac{E_x^n\left(i+\frac{1}{2}, j+1, k\right) - E_x^n\left(i+\frac{1}{2}, j, k\right)}{\Delta y} + \frac{E_y^n\left(i, j+\frac{1}{2}, k\right) - E_y^n\left(i+1, j+\frac{1}{2}, k\right)}{\Delta x}\right] \quad (3)$$

$$E_x^{n+1}\left(i+\frac{1}{2}, j, k\right) = E_x^n\left(i+\frac{1}{2}, j, k\right) + \frac{\Delta t}{\varepsilon\left(i+\frac{1}{2}, j, k\right)}\left[\frac{H_z^{n+\frac{1}{2}}\left(i+\frac{1}{2}, j+\frac{1}{2}, k\right) - H_z^{n+\frac{1}{2}}\left(i+\frac{1}{2}, j-\frac{1}{2}, k\right)}{\Delta y} + \frac{H_y^{n+\frac{1}{2}}\left(i+\frac{1}{2}, j, k-\frac{1}{2}\right) - H_y^{n+\frac{1}{2}}\left(i+\frac{1}{2}, j, k+\frac{1}{2}\right)}{\Delta z}\right] \quad (4)$$

$$E_y^{n+1}\left(i, j+\frac{1}{2}, k\right) = E_y^n\left(i, j+\frac{1}{2}, k\right) + \frac{\Delta t}{\varepsilon\left(i, j+\frac{1}{2}, k\right)}\left[\frac{H_x^{n+\frac{1}{2}}\left(i, j+\frac{1}{2}, k+\frac{1}{2}\right) - H_x^{n+\frac{1}{2}}\left(i, j+\frac{1}{2}, k-\frac{1}{2}\right)}{\Delta z} + \frac{H_z^{n+\frac{1}{2}}\left(i-\frac{1}{2}, j+\frac{1}{2}, k\right) - H_z^{n+\frac{1}{2}}\left(i+\frac{1}{2}, j+\frac{1}{2}, k\right)}{\Delta x}\right] \quad (5)$$

$$E_z^{n+1}\left(i, j, k+\frac{1}{2}\right) = E_z^n\left(i, j, k+\frac{1}{2}\right) + \frac{\Delta t}{\varepsilon\left(i, j, k+\frac{1}{2}\right)}\left[\frac{H_z^{n+\frac{1}{2}}\left(i+\frac{1}{2}, j, k+\frac{1}{2}\right) - H_y^{n+\frac{1}{2}}\left(i-\frac{1}{2}, j, k+\frac{1}{2}\right)}{\Delta x} + \frac{H_y^{n+\frac{1}{2}}\left(i, j-\frac{1}{2}, k+\frac{1}{2}\right) - H_x^{n+\frac{1}{2}}\left(i, j+\frac{1}{2}, k+\frac{1}{2}\right)}{\Delta y}\right] \quad (6)$$

Using the above six equations, the way of propagation of light or electromagnetic radiation through the photonic crystal slab can be analyzed. By observing an electric field above the defect and conducting Fourier transformation, its frequency spectrum is obtainable.

First described is a linear waveguide with a cylindrical hole corresponding to one period removed. As long as the normalized frequency f is in the range of 0.27 to 0.28 (c/a), light or electromagnetic radiation can propagate through a waveguide without a loss. The lattice constant is determined so that the wavelength of light or electromagnetic radiation to be propagated may meet this condition. In this example, the wavelength of light or electromagnetic radiation to be propagated is set to be 1.55 μm, f=0.275 (c/a) corresponding to the center of the range of 0.27 to 0.28 (c/a) is 1.55 μm, then "a" is computed to be 0.42625 μm from 0.275×1.55 μm.

Figure 22:
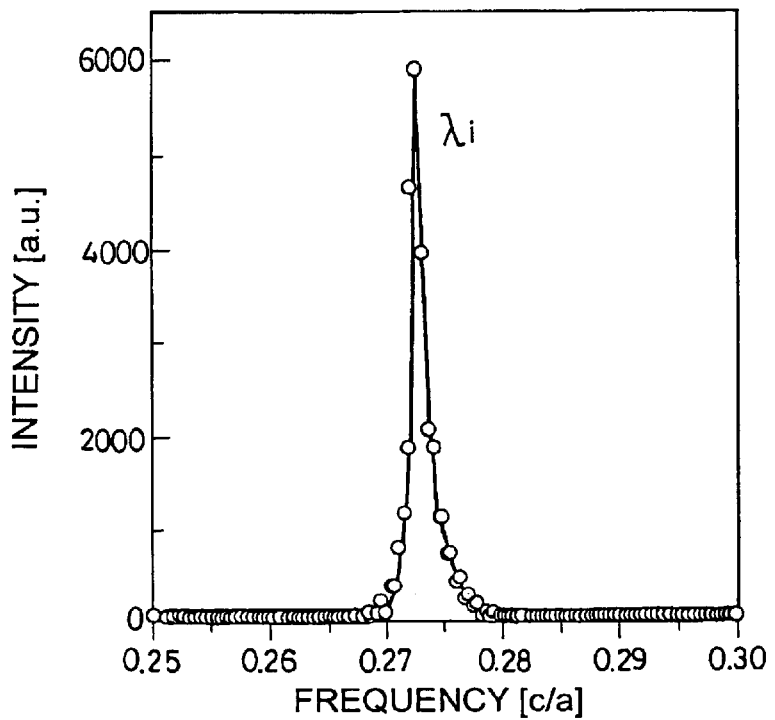
FIG. 22 is a graph showing the frequency and intensity of light or electromagnetic radiation radiated in the orthogonal direction from the point defect disposed adjacent to the 2D photonic crystal slab waveguide of FIG. 1.

FIG. 22 shows the frequency and intensity of light or electromagnetic radiation radiated in the orthogonal direction from the point defect disposed adjacent to the waveguide. It is understood that the point defect is provided by changing the radius of one cylindrical hole to 0.56a. It is seen from the diagram that light or electromagnetic radiation at the normalized frequency f=0.273 (c/a) is radiated in upward and downward directions. The Q value is approximately 500.

Figure 23:
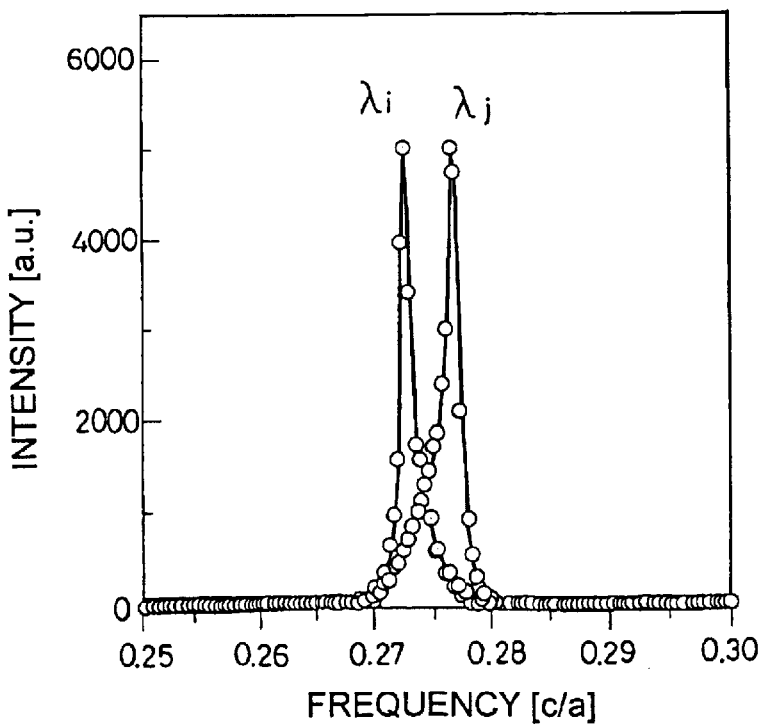
FIG. 23 is a graph showing the frequency and intensity of light or electromagnetic radiation radiated in the orthogonal direction from the two point defects disposed adjacent to the 2D photonic crystal slab waveguide of FIG. 2.

FIG. 23 shows the frequency and intensity of light or electromagnetic radiation radiated from each point defect in the embodiment of FIG. 2 wherein point defects of different size are disposed adjacent to the waveguide. In this example, the point defects are cylindrical holes having a radius of 0.56a and 0.58a. It is seen that light or electromagnetic radiation at the frequency f=0.2729 (c/a) and f=0.2769 (c/a) is radiated. The Q value of the defects is approximately 500 in either case.

It is confirmed from these results that a waveguide created by introducing a line defect and a point defect in the 2D photonic crystal has a function of transmitting light or electromagnetic radiation into and out of the point defect and a function as a wavelength demultiplexer/multiplexer of the plane output type.

A wavelength demultiplexer fabricated by providing a point defect in proximity to a 2D photonic crystal waveguide according to the invention is able to input and output light or electromagnetic radiation in the orthogonal direction despite the 2D photonic crystal structure. Since light or electromagnetic radiation of a selected wavelength can be input or output from the point defect in a demultiplexed manner, there can be realized an ultrasmall wavelength demultiplexer. This also enables relatively easy realization of a steric ultrasmall light or electromagnetic circuit.

Japanese Patent Application No. 2000-084869 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A two-dimensional photonic crystal comprising:
    a two-dimensional photonic crystal structure based on a slab formed of a material having a higher refractive index than air, in which a material having a lower refractive index than said slab material is periodically arrayed into said slab to provide a refractive index distribution;
    a photonic crystal waveguide created by forming a line defect in the periodic array of photonic crystal, the line defect functioning as a waveguide; and
    at least one point defect disposed adjacent to said photonic crystal waveguide to act as a disorder in the periodic array of photonic crystal,
    wherein said at least one point defect functions as a light or electromagnetic radiation outlet/inlet port for trapping light or electromagnetic radiation of a selected wavelength among light or electromagnetic radiation propagating through the waveguide and radiating said trapped light or electromagnetic radiation along a direction that intersects said slab, or trapping light or electromagnetic radiation of a selected wavelength received along said direction that intersects said slab from outside the waveguide and introducing said trapped light or electromagnetic radiation into the waveguide.

2. The two-dimensional photonic crystal of claim 1 wherein the light or electromagnetic radiation outlet/inlet port is configured to radiate or introduce the light or electromagnetic radiation propagating in a direction orthogonal to the slab surface.

3. The two-dimensional photonic crystal of claim 1 wherein the wavelength of light or electromagnetic radiation radiated or introduced by said point defect differs depending on a shape of said point defect.

4. The two-dimensional photonic crystal of claim 1 wherein the array of the lower refractive index material is formed by filling cylindrical holes in the slab with the lower refractive index material.

5. The two-dimensional photonic crystal of claim 1 wherein the array of the lower refractive index material is a triangular lattice array.

6. The two-dimensional photonic crystal of claim 1 wherein said point defect is configured so as to be asymmetric on opposite sides with respect to the slab surface.

7. The two-dimensional photonic crystal of claim 1 wherein said slab material has a refractive index of at least 2.0.

8. The two-dimensional photonic crystal of claim 7 wherein said slab material is an inorganic material comprising at least one element selected from the group consisting of In, Ga, Al, Sb, As, Ge, Si, P, N, and O or an organic material.

9. The two-dimensional photonic crystal of claim 1 wherein the lower refractive index material is air.

10. A photonic crystal multiplexer/demultiplexer comprising the two-dimensional photonic crystal waveguide of claim 1.

11. The photonic crystal multiplexer/demultiplexer of claim 10 comprising a plurality of point defects, wherein a wavelength of light or electromagnetic radiation radiated or trapped by each point defect of said plurality of point defects differs one from another.

12. The photonic crystal multiplexer/demultiplexer of claim 10, further comprising an optical fiber disposed in proximity to the at least one point defect.

13. The photonic crystal multiplexer/demultiplexer of claim 10, further comprising a semiconductor device having a photoelectric conversion function disposed in proximity to the point defect.

* * * * *

UNITED STATES PATENT AND TRADEMARK OFFICE
CERTIFICATE OF CORRECTION

PATENT NO. : 6,738,551 B2
DATED : May 18, 2004
INVENTOR(S) : Noda et al.

It is certified that error appears in the above-identified patent and that said Letters Patent is hereby corrected as shown below:

<u>Title page,</u>
Item [73], Assignees, should read as follows:
-- [73] Assignees: TDK Corporation, Tokyo (JP);
              Kansai Technology Licensing
              Organization Co., Ltd., Kyoto (JP) --

<u>Column 4,</u>
Line 35, after "waveguide" please insert -- . --.
Line 35, begin a new paragraph with "Figure 5...defect."

<u>Column 8,</u>
Equation (2) "$E_y^n$" should be -- $E_z^n$ -- in the second line of the equation.

Signed and Sealed this

Thirtieth Day of November, 2004

JON W. DUDAS
*Director of the United States Patent and Trademark Office*